(No Model.)

I. SCHEUER.
SHAWL STRAP HANDLE.

No. 347,201. Patented Aug. 10, 1886.

WITNESSES
Jno. M. Rosenbaum
Martin Petry

INVENTOR
Isaac Scheuer
By his Attorneys
Goepel & Raegener

UNITED STATES PATENT OFFICE.

ISAAC SCHEUER, OF NEW YORK, N. Y.

SHAWL-STRAP HANDLE.

SPECIFICATION forming part of Letters Patent No. 347,201, dated August 10, 1886.

Application filed November 20, 1885. Serial No. 183,403. (No model.)

*To all whom it may concern:*

Be it known that I, ISAAC SCHEUER, of the city, county, and State of New York, have invented certain new and useful Improvements in Shawl-Strap Handles, of which the following is a specification.

This invention relates to a handle for shawl, book, or other parcel straps, said handle being of cheap and simple construction and completed without any soldering or riveting; and the invention consists of a handle for shawl and other straps made of a flat piece of sheet metal, having loops extending from the body of the handle, the upwardly-bent ends of the loops abutting against the legs of the handle.

Figure 1:
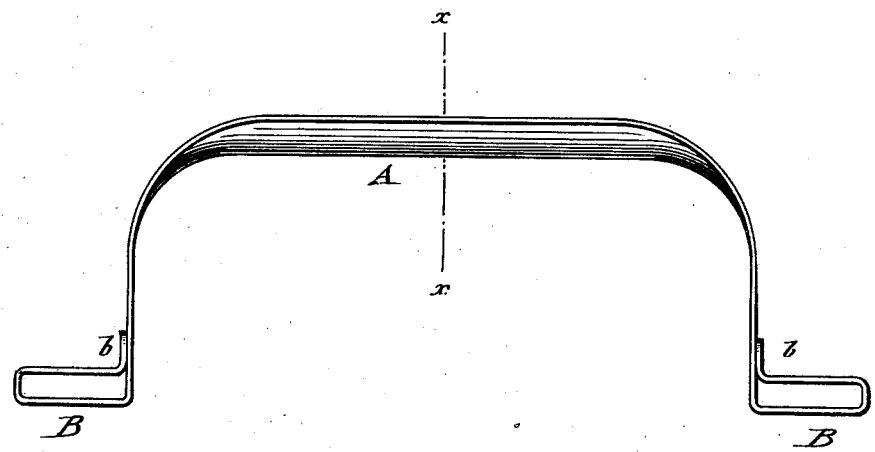
Figure 2:
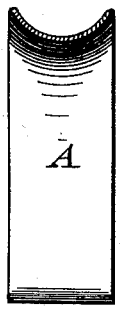
Figure 3:
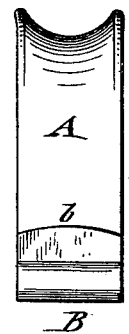

In the accompanying drawings, Figure 1 represents a side elevation of my improved handle for shawl and other straps; and Figs. 2 and 3 are respectively a vertical transverse section on line $x\ x$, Fig. 1, and an end view of the same.

Similar letters of reference indicate corresponding parts.

Referring to the drawings, A represents the body of my improved handle for shawl, book, and other straps, which body is bent in inverted-U shape, and concaved at its middle portion for conveniently taking hold of the handle. The body A is made of one piece of flat sheet metal, and provided at the legs of the U-shaped body with loops B B, that extend in outward direction from the legs of the handle and are made integral therewith. The ends $b$ of the loops B B are bent up in such a manner that they abut against the legs of the handle-body A, as shown in Fig. 1.

The entire handle with the loops is made of one piece of sheet metal of uniform thickness, and bent to the required form by suitable dies. The ends are upset in forming the loops, so that neither soldering nor riveting of the same to the body of the handle is required. The handle is then finished by japanning, nickel or silver plating, so as to form a shawl-strap handle of an extremely simple and cheap construction.

Having thus described my invention, I claim as new and desire to secure by Letters Patent—

A handle for shawl or other straps, made of a strip of sheet metal bent to U shape, and having its ends bent to project outward from the ends of the shanks of the U-shaped handle, then upward, and then toward the shanks, the ends of the strip resting against the shanks of the handle, thus forming loops at the ends of the handle, through which loops straps can be passed, substantially as set forth.

In testimony that I claim the foregoing as my invention I have signed my name in presence of two subscribing witnesses.

ISAAC SCHEUER.

Witnesses:
SIDNEY MANN,
MARTIN PETRY.